United States Patent [19]

Liu

[11] Patent Number: 4,753,462

[45] Date of Patent: Jun. 28, 1988

[54] ADJUSTABLE TUBE CLAMPING CONNECTOR

[76] Inventor: Chin-Lang Liu, No. 20, 7th Rd., Industrial Park, Taichung, Taiwan

[21] Appl. No.: 78,932

[22] Filed: Jul. 28, 1987

[51] Int. Cl.⁴ .......................................... F16L 25/00
[52] U.S. Cl. .................................. 285/420; 285/424; 403/344
[58] Field of Search ............... 285/420, 424, 373, 419; 24/271, 275, 276; 403/344

[56] References Cited

U.S. PATENT DOCUMENTS

| | | | |
|---|---|---|---|
| 1,864,339 | 6/1932 | Church | 285/420 X |
| 2,425,033 | 8/1947 | Fletcher | 285/420 X |
| 4,463,975 | 8/1984 | McCord | 285/419 |

Primary Examiner—Dave W. Arola
Attorney, Agent, or Firm—Varndell Legal Group

[57] ABSTRACT

This invention provides an improved adjustable tube clamping connector, especially one used for making adjustable connection of an inner tube and outer tube as required by the actual conditions. The outer tube has an open slot and is attached by welding to a clamp with two lugs on the slot. Fitted in the cavities of the lugs are a pair of clamping pieces each of which has a pair of extensions with curved surfaces. With the back of the clamp pieces against the bottom of the cavities of the lugs and the curved surfaces of the extensions on the external surface of the outer tube, they will give added strength and pressure to make the outer tube firmly grip and hold the inner tube so as to bear greater load and to ensure safe use.

1 Claim, 4 Drawing Sheets

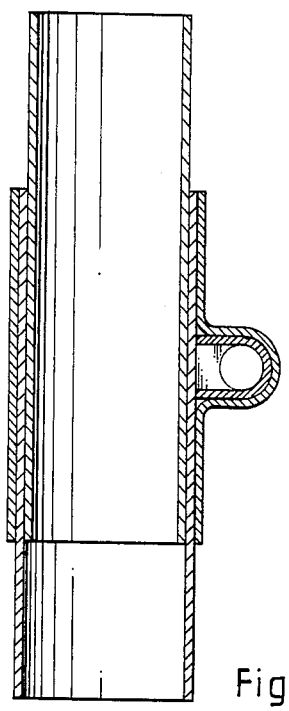
Fig. 2-2 PRIOR ART
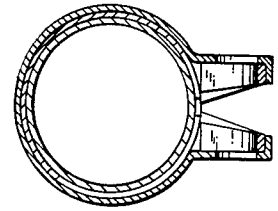
Fig. 2-3 PRIOR ART
Fig. 2-1 PRIOR ART
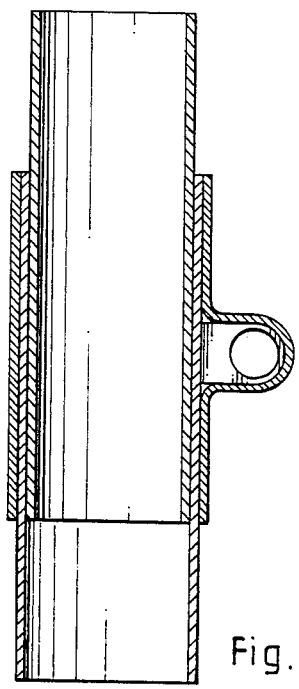
Fig. 3-2 PRIOR ART
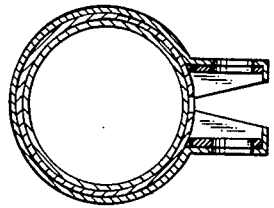
Fig 3-3 PRIOR ART
Fig. 3-1 PRIOR ART

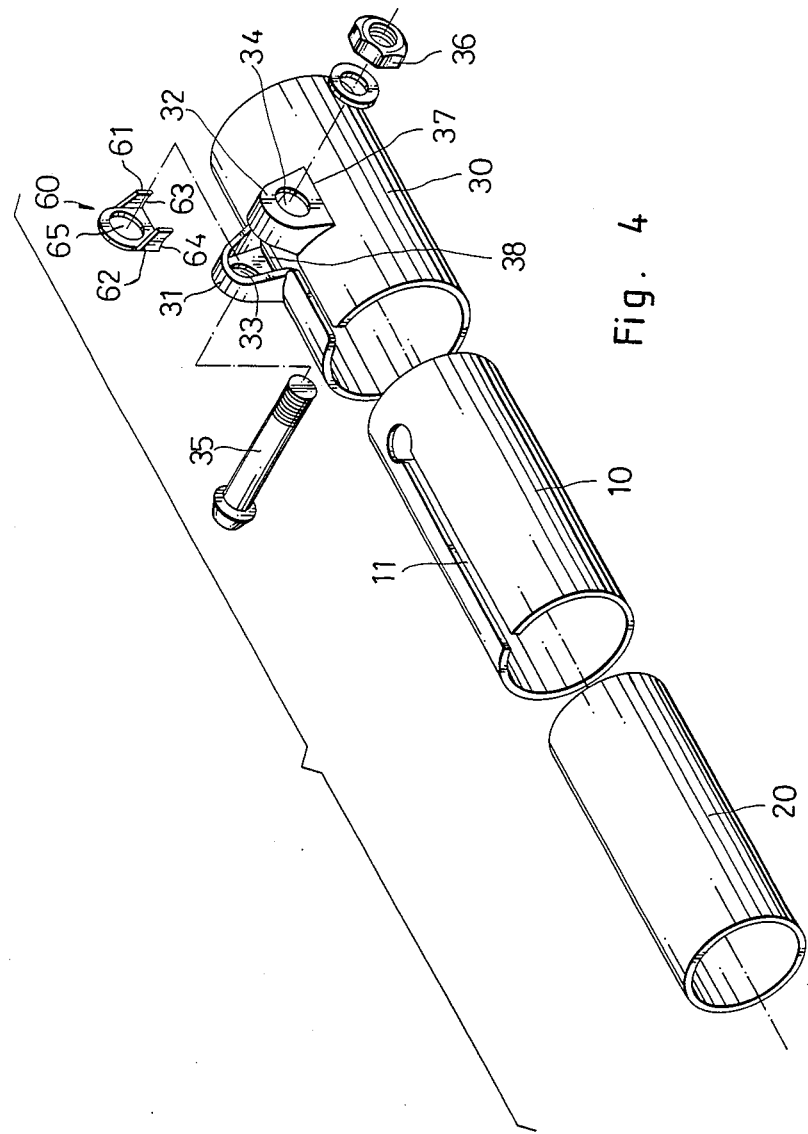

ADJUSTABLE TUBE CLAMPING CONNECTOR

BACKGROUND AND SUMMARY OF THE INVENTION

Adjustable tube clamping connectors have been widely used and there are many types of inner tube gripping devices in the prior art. The present invention is designed to hold the inner tube more firmly without causing any deformation or damage to the inner tube.

As shown in FIG. 1, the conventional adjustable tube clamping connector comprises an outer tube, an inner tube and a clamp. The outer tube has a longitudinal open slot in one side. The clamp is welded to the outer tube and has two lugs on the open slot. The lugs have cavities and are slightly open. When the lugs are brought together by a screw bolt and nut, the outer tube with slot will be clamped to grip and hold the inner tube firmly. To give added strength and pressure for the outer tube to grip the inner tube, two clamping pieces are fitted in the cavities of the lugs.

Also as shown in FIG. 2, the clamping piece is in inverted U shape (as shown in FIG. 2-2) and fitted in the cavity of the lug with its two ends keeping contact with the external surface of the outer tube (as shown in FIG. 2-3). When the lugs are brought together by the screw bolt and nut, the clamping pieces will make the sloted outer tube to grip and hold the inner tube firmly so that it can bear greater vertical load. But for lack of the effect of reinforcing, the lugs and the outer tube will be deformed and damaged when they are tightened by the screw bolt. As a result, it will be difficult to adjust the connection next time.

The application of another clamping piece is shown in FIGS. 3-1 and 3-3. The clamping piece in the shape of a block (as shown in FIG. 3-2) is fitted in the lug with its back perfectly contacting the bottom of the lug and its end well contacting the external surface of the outer tube. So it can give added strength and pressure to the clamp. But the clamping effect depends on the thickness of the clamping piece or the contact area of the clamping piece with the outer tube. The larger the contact area the greater the clamping force. Since such clamping pieces are made by punching press, their thickness is limited. Otherwise, it would be difficult to process and too much waste would be resulted from punching. It does not meet the economic principle of mass production. So the major disadvantage of the conventional device is the limitation thickness and the reduction of steadiness and safety in clamping.

In view of the above mentioned disadvantages, the inventor worked hard to make improvements and developed this invention. So the main object of this invention is to provide an improved adjustable tube clamping connector which has eliminated the disadvantages of the conventional connectors by employing a pair of clamping pieces with extensions which give added strength and pressure to ensure the steadiness and safety in clamping.

Another object of this invention is to provide an improved adjustable tube clamping connector of which the clamping piece can be made by punching in mass production so as to reduce the cost.

BRIEF DESCRIPTION OF THE DRAWINGS

FIG. 2-1 is a longitudinal section of the conventional adjustable tube clamping connector.

FIG. 2-2 is a view of a clamping piece of the conventional adjustable tube clamping connector.

FIG. 2-3 is a cross section of one conventional adjustable tube clamping connector.

FIG. 3-1 is a longitudinal section of the conventional adjustable tube clamping connector.

FIG. 3-2 is a view of another clamping piece of the conventional adjustable tube clamping connector.

FIG. 3-3 is a cross section of another conventional adjustajbl tube clamping connector.

FIG. 4 is an exploded view of the improved adjustable tube clamping connector of this invention.

FIG. 4-1 is a longitudinal section of the said improved tube clamping connector.

FIG. 4-2 is a cross section of the said improved adjustable tube clamping connector.

DETAILED DESCRIPTION OF THE PREFERRED EMBODIMENT

Below is a detailed description of the preferred embodiment of this invention.

Figure 1:
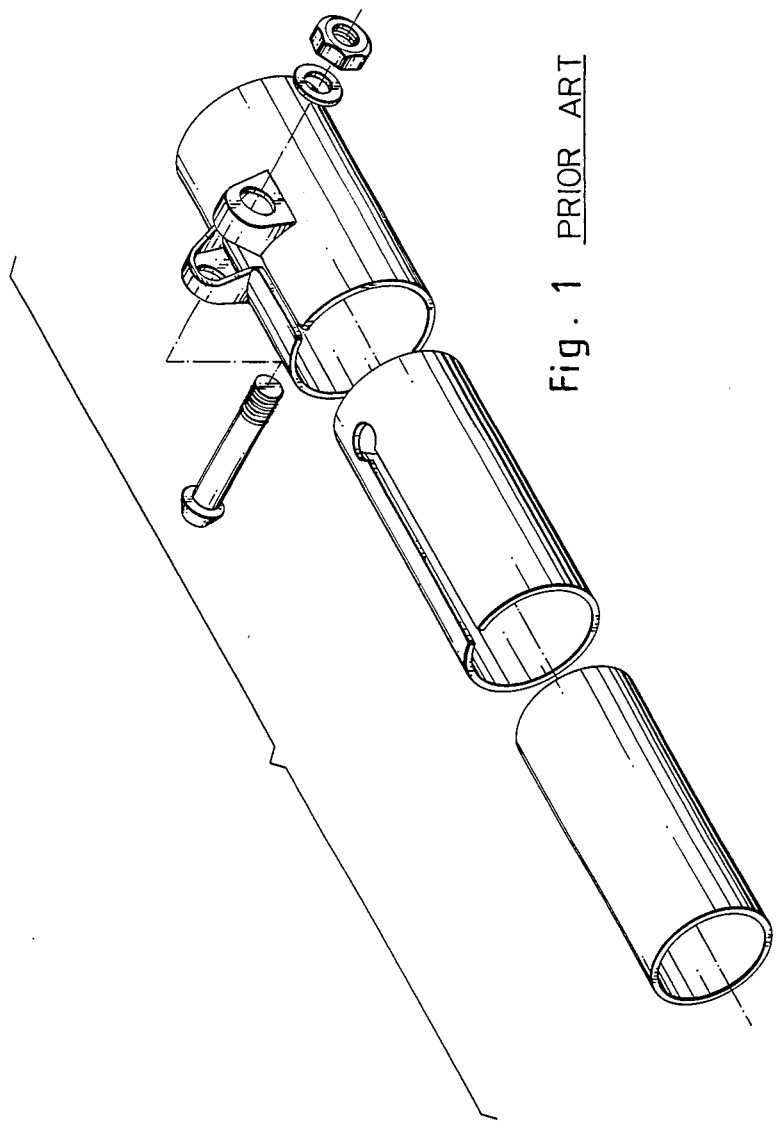
FIG. 1 is an exploded view of the conventional adjustable tube clamping connector.
Figures 1, 2, 4:
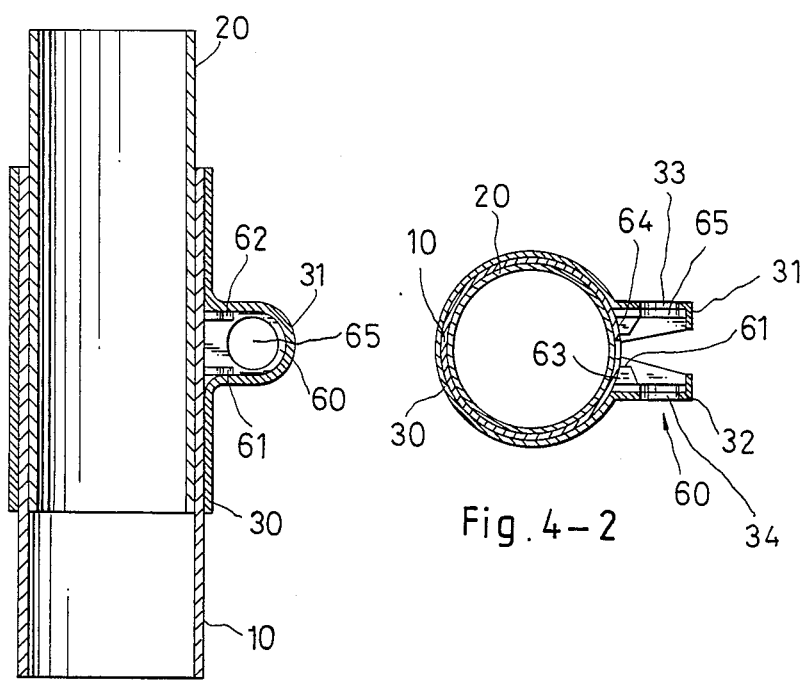

As shown in FIG. 4 the improved adjustable tube clamping connector comprises an outer tube 10, an inner tube 20, a clamp 30, and a pair of clamping pieces. The outer tube 10 has an open slot 11 at one side. The clamp 30 is welded to the outer tube 10 and has two lugs 31, 32 on the open slot. The lugs 31, 32 have bolt holes 33, 34, for a screw bolt 35 to fit in. The lugs 31, 32 can be brought together by the screw bolt 35 and nut 36. Each of the clamping pieces 60 has two extensions 61, 62 from the edges of the front side, and a hole 65 in the flat part for the bolt 35 to fit in after the clamping pieces are fitted in the cavities of the lugs 31, 32. The clamping pieces 60 are fitted perfectly in the cavities of the extensions 61, 62 and have curved surfaces 63, 64 as shown in FIG. 4-1 which keep close contact with the wall surface of the outer tube 10 as shown in FIG. 4-2 and give added strength to the lugs 31, 32. With these larger curved surfaces 63, 64 of the extensions 61, 62, greater pressure can be applied on a greater area of the outer tube when the screw bolt 35 is tightened. The inner tube 20 is thus gripped and held firmly and can bear greater working pressure.

I claim:

1. An improved adjustable tube clamping connector comprising:
   an outer tube having an open slot at one side,
   an inner tube fitted in the outer tube for adjustable connection,
   a clamp having an open slot at one side attached by welding to the outer tube and having a lug with a bolt hole therein on each side of the slot with cavities opening to the slot and having a bottom facing the slot for a pair of clamping pieces to fit in, and two clamping pieces each having a back and a pair of extensions with curved surfaces extending from the back and fitted in the cavities of the lugs in such way that the back of the clamping piece is closely attached to the bottom of the cavity and the curved surface keeps close contact with the surface of the outer tube so that they can give added strength and pressure when the lugs are brought together by a screw bolt and nut cooperating with said bolt holes.

* * * * *